(12) United States Patent
Leingruber et al.

(10) Patent No.: US 10,267,415 B1
(45) Date of Patent: Apr. 23, 2019

(54) METHOD FOR OPERATING AN AUTOMATIC TRANSMISSION WITH RESISTANCE CHANGE IN A CONTROL SYSTEM OF THE AUTOMATIC TRANSMISSION

(71) Applicant: ZF Friedrichshafen AG, Friedrichshafen (DE)

(72) Inventors: Kai Leingruber, Ravensburg (DE); Gerd Muellerschoen, Kressbronn (DE); Matthias Dietlmeier, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/729,166

(22) Filed: Oct. 10, 2017

(51) Int. Cl.
*F16H 61/12* (2010.01)
*F16H 61/02* (2006.01)
*F16H 3/66* (2006.01)

(52) U.S. Cl.
CPC ......... *F16H 61/12* (2013.01); *F16H 61/0213* (2013.01); *F16H 3/66* (2013.01); *F16H 2061/1264* (2013.01); *F16H 2200/0065* (2013.01); *F16H 2200/2012* (2013.01); *F16H 2200/2041* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS

| 5,083,273 | A | * | 1/1992 | Nishiwaki | F16D 48/064 477/174 |
| 7,609,496 | B2 | * | 10/2009 | Motonobu | F16H 61/12 361/103 |

\* cited by examiner

*Primary Examiner* — Dirk Wright
(74) *Attorney, Agent, or Firm* — Dority & Manning, P.A.

(57) ABSTRACT

A method for operating an automatic transmission with resistance change in a control system of the automatic transmission includes detecting an electrical resistance increase in a control loop for a shift element actuator of the automatic transmission, adjusting an electrical current to the shift element actuator in response to the electrical resistance increase, and shifting the automatic transmission to a gear in which the shift element is in the open operating state. A related control device for an automatic transmission is also provided.

18 Claims, 2 Drawing Sheets

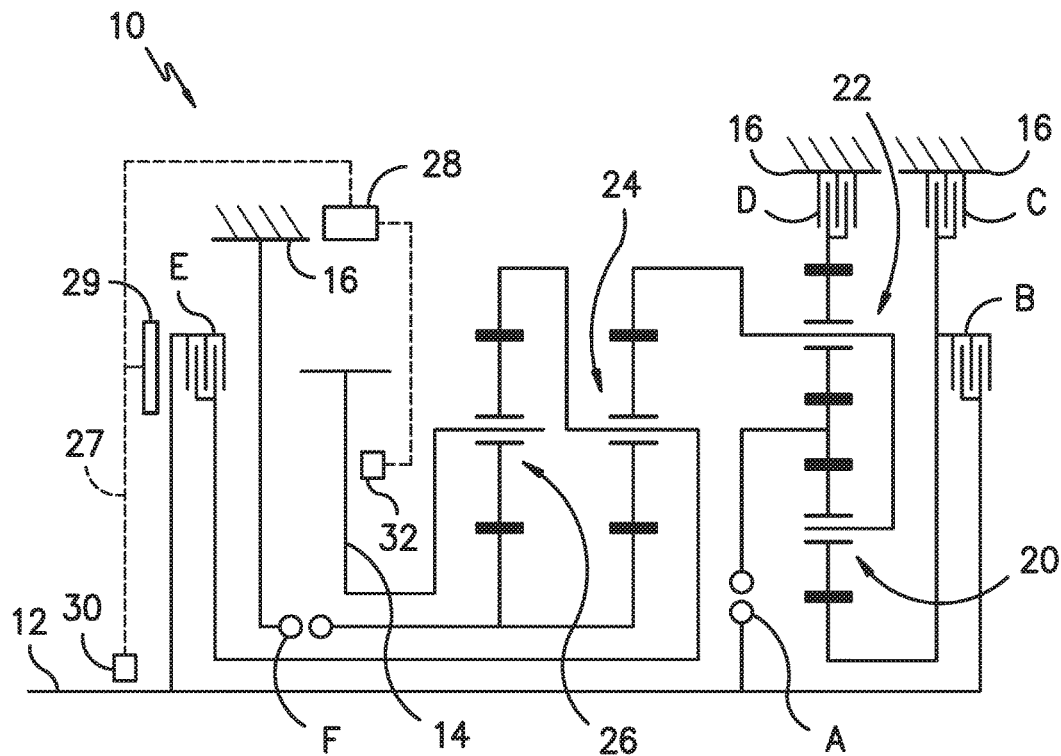
FIG. -1-
| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |
FIG. -2-

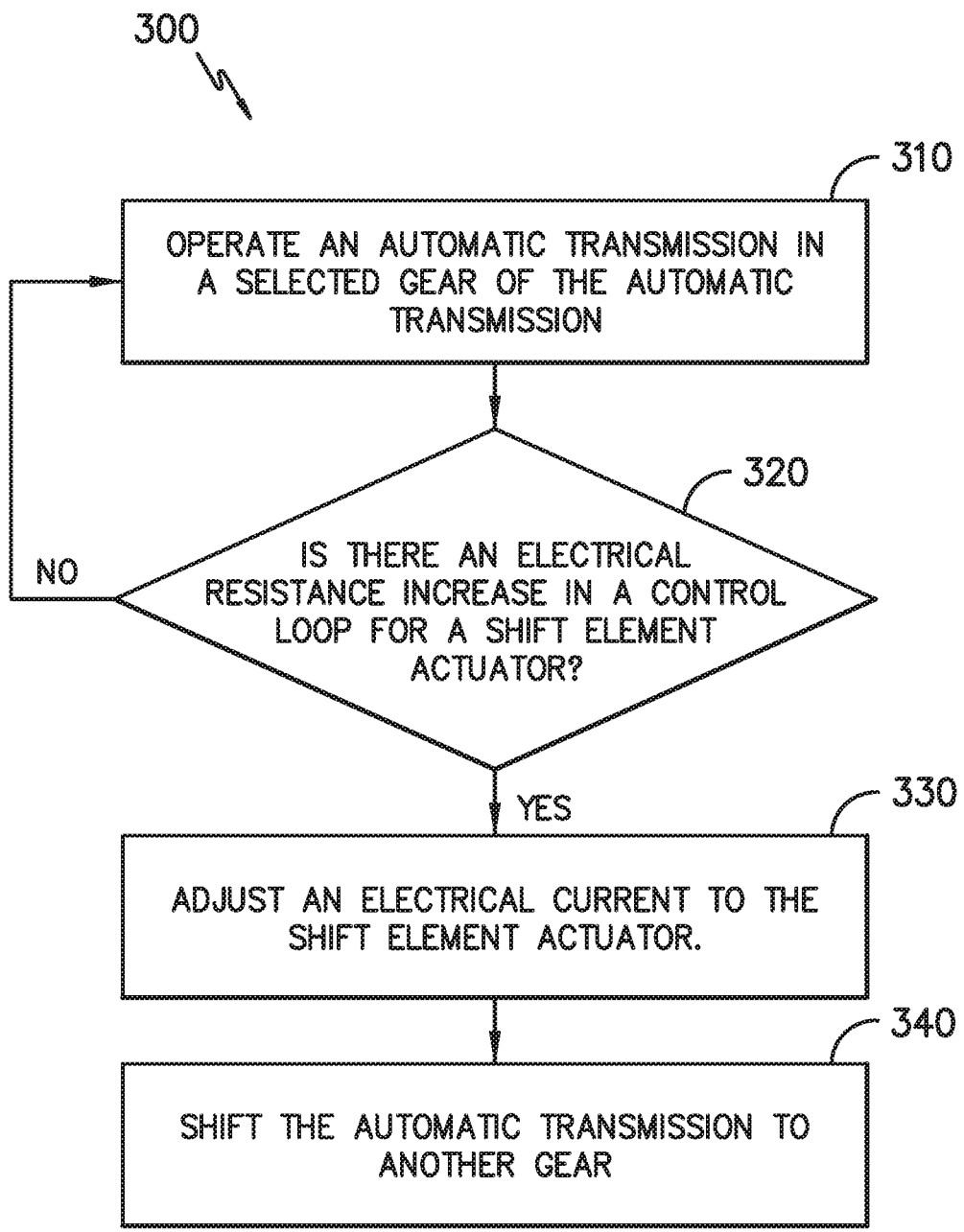
FIG. -3-

METHOD FOR OPERATING AN AUTOMATIC TRANSMISSION WITH RESISTANCE CHANGE IN A CONTROL SYSTEM OF THE AUTOMATIC TRANSMISSION

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. Transmission control systems selectively open and close the shift elements to adjust the gear ratio of the automatic transmission and shift the automatic transmission between its various gears. Known control systems deliver electrical current to solenoid valves that adjust hydraulic fluid flow to the shift elements. However, various conditions can increase an electrical resistance within the control systems.

Increased electrical resistance within the control system can be problematic. In particular, precisely opening and closing the shift elements can be difficult due to the increased electrical resistance. Certain automatic transmissions are configured for coasting the vehicle to a stop when increased electrical resistance is detected within the control system. However, stopping the vehicle when there is increased electrical resistance within the control system can be inconvenient to a driver of a vehicle associated with the automatic transmissions.

BRIEF DESCRIPTION OF THE INVENTION

The present subject matter provides a method for operating an automatic transmission that can allow a vehicle associated with the automatic transmission to continue driving when increased electrical resistance within a control system of the automatic transmission is detected. In particular, a method for operating an automatic transmission with resistance change in a control system of the automatic transmission includes detecting an electrical resistance increase in a control loop for a shift element actuator of the automatic transmission, adjusting an electrical current to the shift element actuator in response to the electrical resistance increase, and shifting the automatic transmission to a gear in which the shift element is in the open operating state. A related control device for an automatic transmission is also provided. Additional aspects and advantages of the invention will be set forth in part in the following description, or may be apparent from the description, or may be learned through practice of the invention.

In a first example embodiment, a method for operating an automatic transmission with resistance change in a control system of the automatic transmission includes detecting an electrical resistance increase in a control loop for a shift element actuator of the automatic transmission. The shift element actuator is operable to adjust a shift element of the automatic transmission between an open operating state and a closed operating state. The method also includes adjusting an electrical current to the shift element actuator in response to the electrical resistance increase and shifting the automatic transmission to a gear in which the shift element is in the open operating state.

In a second example embodiment, a control device for an automatic transmission is provided. The automatic transmission has a shift element actuator operable to adjust a shift element between an open operating state and a closed operating state. The control device includes a processor and a memory storing computer-executable instructions that, when executed by the processor, cause the processor to perform operations. The operation include detecting an electrical resistance increase in a control loop for the shift element actuator, adjusting an electrical current to the shift element actuator in response to the electrical resistance increase, and shifting the automatic transmission to a gear in which the shift element is in the open operating state.

In a third example embodiment, a method for operating an automatic transmission with resistance change in a control system of the automatic transmission includes detecting an electrical resistance increase in a control loop for a solenoid valve of the automatic transmission. The solenoid valve is operable to adjust a multidisc friction shift element of the automatic transmission between an open operating state and a closed operating state. The method also includes reducing a torque limit for driver requested torque in response to the electrical resistance increase, adjusting an electrical current to the solenoid valve in response to the electrical resistance increase, and shifting the automatic transmission to a gear in which the multi-disc friction shift element is in the open operating state after reducing the torque limit and adjusting the electrical current.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of an automatic transmission according to an example embodiment of the present subject matter.

FIG. 2 illustrates a table of an example shifting scheme as may be used with the example automatic transmission of FIG. 1.

FIG. 3 illustrates a method for operating an automatic transmission according to an example embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an example embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10 in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle.

Automatic transmission 10 also includes four planetary gear sets: a first planetary gear set 20; a second planetary gear set 22; a third planetary gear set 24 and a fourth planetary gear set 26. In certain example embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the example embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the example embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may be non-volatile and represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Various components of automatic transmission 10 may be in communication with electronic control unit 28, e.g., via a suitable wiring harness 27. For example, electronic control unit 28 is in operative communication with shift element actuators (e.g., solenoid valves) of the shifting elements of automatic transmission 10. Thus, electronic control unit 28 may selectively adjust the shifting elements between the engaged configuration and the disengaged configuration, e.g., by selectively opening and closing the associated shift element actuators of the shifting elements. In such a manner, electronic control unit 28 may shift automatic transmission 10 between gears during operation of automatic transmission 10.

As a particular example, electronic control unit 28 is in operative communication with a solenoid valve 29 of multidisc clutch E. The wiring harness 27 (shown schematically with the dashed lines in FIG. 1) connects the electronic control unit 28 with the solenoid valve 29 to assist with forming a control loop for the multidisc clutch E. Electronic control unit 28 may adjust an electrical current supplied to solenoid valve 29 such that solenoid valve 29 selectively adjusts multidisc clutch E between a closed operating state and an open operating state. In the closed operating state, multidisc clutch E connects or couples input shaft 12 to the planet carrier of third planetary gear set 24 and the ring gear of fourth planetary gear set 26. In contrast, input shaft 12 is not coupled to the planet carrier of third planetary gear set 24 and the ring gear of fourth planetary gear set 26 by multidisc clutch E in the open operating state. While not shown in FIG. 1, the other shift elements of automatic transmission 10 may include similar shift element actuators or solenoid valves for adjusting the shift elements between the open and closed operating states.

In certain example embodiments, a flow rate of hydraulic fluid through solenoid valve 29 is proportional to the magnitude of the electrical current supplied to solenoid valve 29 by electronic control unit 28. Thus, electronic control unit 28 may adjust the magnitude of the electrical current supplied to solenoid valve 29 in order to adjust the flow rate of hydraulic fluid through solenoid valve 29 and set the closing pressure applied to multidisc clutch E. As a particular example, electronic control unit 28 may increase the magnitude of the electrical current supplied to solenoid valve 29 in order to increase the flow rate of hydraulic fluid through solenoid valve 29 and increase the closing pressure applied to multidisc clutch E by the hydraulic fluid. By setting the magnitude of the electrical current supplied to solenoid valve 29 to a slip operating state value, the solenoid valve 29 may adjust the multidisc clutch E to a slip operating state in which kinetic friction between the discs/plates of multidisc clutch E transfers torque from input shaft 12 to the planet carrier of third planetary gear set 24 and the ring gear of fourth planetary gear set 26. In contrast, static friction between the discs/plates of multidisc clutch E transfers torque from input shaft 12 to the planet carrier of third planetary gear set 24 and the ring gear of fourth planetary gear set 26 when solenoid valve 29 adjusts the multidisc clutch E to the closed operating state. Thus, solenoid valve 29 may adjust the closing pressure applied to multidisc clutch E such that multidisc clutch E is shiftable to states between the open and closed operating states.

Electronic control unit 28 may shift automatic transmission 10 between gears during operation of automatic transmission 10 based at least in part on signals from input speed sensor 30 and output speed sensor 32. Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an example shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain example embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain example embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc. In addition, the present subject matter may be used in automatic transmissions with various driveline configurations, such as front-wheel drive, rear-wheel drive, all-wheel drive, etc.

FIG. 3 illustrates a method 300 for operating an automatic transmission according to an example embodiment of the present subject matter. Method 300 may be used to operate automatic transmission 10. Thus, method 300 is described in greater detail below in the context of automatic transmission 10. However, it will be understood that method 300 may be used with other suitable automatic transmissions in alternative embodiments as noted above. As discussed in greater detail below, method 300 includes features for operating automatic transmission 10 when there is an electrical resistance change within a control loop of automatic transmission 10. In particular, method 300 may assist with allowing a vehicle associated with automatic transmission 10 to continue driving when there is an electrical resistance change within a control loop of automatic transmission 10.

At 310, method 300 includes operating automatic transmission 10 in a selected gear of automatic transmission 10. As an example, the selected gear may be any one of the nine forward gears of automatic transmission 10 described above. In the selected gear, electronic control unit 28 adjusts the combination of shift elements required for the selected gear to the closed operating state, e.g., by increasing a magnitude of the electrical current supplied to the shift element actuators associated with the combination of shift elements. For example, the selected gear may be the fourth gear shown in FIG. 2, and electronic control unit 28 may set the magnitude of the electrical current supplied to the solenoid valves associated with dog clutch A, multidisc clutch E and dog clutch F in order to maintain the dog clutch A, multidisc clutch E and dog clutch F in the engaged configuration/closed operating state.

At 320, method 300 includes detecting an electrical resistance increase in a control loop for a shift element actuator of automatic transmission 10. Thus, e.g., when automatic transmission 10 is operating in the fourth gear at 310, method 300 may detect an electrical resistance increase within the control loop for multidisc clutch E. Various conditions within automatic transmission 10 can increase the electrical resistance within the control loop for multidisc clutch E. For example, a connector of the wiring harness 27 to solenoid valve 29 may become loose, corroded or damaged such that the electrical resistance within the control loop for multidisc clutch E increases. The electrical resistance increase can affect the electrical current required to shift multidisc clutch E between the open and closed operating state via solenoid valve 29. Thus, method 300 includes features for operating automatic transmission 10 despite such increased electrical resistance. Any suitable method or mechanism may be used to determine whether the electrical resistance within the control loop is increased at 320. For example, automatic transmission 10 may include an ohmmeter for directly measuring the electrical resistance within the control loop. The increased electrical resistance may also be detected indirectly, e.g., based upon feedback of the control loop of multidisc clutch E in response to current supplied to the solenoid valve 29.

If no increased electrical resistance is detected at 320, method 300 loops back to 310, and automatic transmission 10 continues to operate normally in the selected gear. Conversely, method 300 continues to 330 when increased electrical resistance is detected within the control loop at 320. At 330, electronic control unit 28 adjusts the electrical current supplied to the affected shift element actuator. Thus, e.g., in response to the electrical resistance increase within the control loop for multidisc clutch E, electronic control unit 28 may adjust (e.g., decrease) the electrical current to solenoid valve 29 at 320.

In addition to adjusting the electrical current at 320, method 300 may also include activating a warning in response to the electrical resistance increase at 320. The warning informs a user of automatic transmission 10 of a fault in automatic transmission 10. Thus, e.g., method 300 may include activating a check transmission light on a dashboard of a vehicle associated with automatic transmission 10 in response to the electrical resistance increase at 320.

Method 300 may also include reducing a torque limit for driver requested torque in response to the electrical resistance increase at 320. A maximum current supplied to the shift element actuator of the affected shift element may vary with the torque limit. Thus, e.g., electronic control unit 28 (or another controller, such as an engine control unit) may reduce the torque limit for driver requested torque in response to the electrical resistance increase at 320. In particular, electronic control unit 28 or the engine control unit may reduce the torque limit such that solenoid valve 29 multidisc clutch E firmly remains in the closed operating state and avoids the slip operating state. Thus, input torque at input shaft 12 and/or torque at multidisc clutch E may be limited in method 300, e.g., in order to avoid the slip operating state in multidisc clutch E when the electrical resistance increase is present within the control loop for multidisc clutch E. Automatic transmission 10 may operate more reliably when multidisc clutch E avoids unintentionally entering the slip operating state.

After adjusting the electrical current supplied to the affected shift element actuator, warning the user and/or reducing the torque limit, method 300 includes shifting automatic transmission 10 out of the selected gear. Thus, at 340, method 300 includes shifting automatic transmission 10 out of the selected gear and into another gear in which the affected shift element is in the open operating state. The other gear may be any one of the nine forward gears of automatic transmission 10 described above. In the other gear, electronic control unit 28 adjusts the combination of shift elements required for the other gear to the closed operating state, e.g., by increasing a magnitude of the electrical current supplied to the shift element actuators associated with the combination of shift elements. Continuing the example discussed above where the selected gear is the fourth gear shown in FIG. 2, the other gear selected gear may be the third gear shown in FIG. 2, and electronic control unit 28 may set the magnitude of the electrical current supplied to the solenoid valves associated with dog clutch A, multidisc clutch B and dog clutch F in order to maintain the dog clutch A, multidisc clutch B and dog clutch F in the engaged configuration/closed operating state after adjusting the electrical current supplied to multidisc clutch E when the electrical resistance increase is present within the control loop for multidisc clutch E at 320.

Method 300 may also include keeping or maintaining automatic transmission 10 in the gear in which the affected shift element is in the open operating state until standstill of a vehicle associated with automatic transmission 10. Thus, method 300 may avoid shifting the automatic transmission 10 to a gear in which the affected shift element is required to be closed. For example, method 300 may allow automatic transmission 10 to shift to any of the first gear, second gear or third gear shown in FIG. 2 when the electrical resistance increase is present within the control loop for multidisc clutch E at 320. In such a manner, method 300 can allow automatic transmission 10 to operate in various (e.g., multiple) gears despite the electrical resistance increase present within a control loop of a shift element actuator.

It will be understood that while discussed above in the context of an example with multidisc clutch E and solenoid valve 29, method 300 may similarly be used to detect and address electrical resistance increases within control loops for other shift elements within automatic transmission 10 in alternative example embodiments.

As may be seen from the above, method 300 detects increased electrical resistance to a shift element actuator and sets a fault code when the increased electrical resistance is detected. In response to the fault code, a driver may be warned with a transmission warning light, and a driver requested torque may be limited by the automatic transmission 10. Method 300 also reduces a target current of the shift element actuator in response to the fault code. The target current may be proportional to a closing pressure applied to a shift element associated with the shift element actuator, and the target current may be reduced to a level where all shifts with the affected shift element are still possible in order to allow the automatic transmission 10 to shift to another gear as discussed below. The shift element actuator may be supplied with an electrical current having a maximum magnitude of the target current, e.g., to avoid entering a slip operating state of the affected shift element. After shifting automatic transmission 10 into a gear in which the affected shift element is not needed, method 300 keeps automatic transmission 10 in such gear until standstill of a vehicle associated with the automatic transmission 10. In such a manner, method 300 permits continued travel with the vehicle associated with the automatic transmission 10 despite the fault code. In particular, method 300 detects unexpected resistance change in a closed-loop shift element control system of automatic transmission 10, and method 300 informs the driver of the possible defect while allowing driving in at least one gear.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an automatic transmission with resistance change in a control system of the automatic transmission, comprising:
    detecting an electrical resistance increase in a control loop for a shift element actuator of the automatic transmission, the shift element actuator operable to adjust a shift element of the automatic transmission between an open operating state and a closed operating state;
    adjusting an electrical current to the shift element actuator in response to the electrical resistance increase; and
    shifting the automatic transmission to a gear in which the shift element is in the open operating state.

2. The method of claim 1, further comprising reducing a torque limit for driver requested torque in response to the electrical resistance increase.

3. The method of claim 2, wherein the shift element is a hydraulically actuated multi-disc friction shift element and the shift element actuator is a solenoid valve.

4. The method of claim 3, wherein adjusting the electrical current to the solenoid valve comprises reducing the electrical current to the solenoid valve.

5. The method of claim 2, wherein the torque limit is reduced and the electrical current is adjusted prior to shifting the automatic transmission to the gear in which the shift element is in the open operating state.

6. The method of claim 1, wherein the shift element is a hydraulically actuated multi-disc friction shift element and the shift element actuator is a solenoid valve.

7. The method of claim 1, further comprising maintaining the automatic transmission in the gear in which the shift element is in the open operating state until standstill of a vehicle associated with the automatic transmission.

8. The method of claim 1, further comprising activating a warning in response to the electrical resistance increase, the warning informing a user of the automatic transmission of a fault in the automatic transmission.

9. A control device for an automatic transmission having a shift element actuator operable to adjust a shift element between an open operating state and a closed operating state, the control device comprising:
    one or more processors; and
    one or more memories storing computer-executable instructions that, when executed by the one or more processors, cause the one or more processors to perform operations comprising
        detecting an electrical resistance increase in a control loop for the shift element actuator;
        adjusting an electrical current to the shift element actuator in response to the electrical resistance increase; and
        shifting the automatic transmission to a gear in which the shift element is in the open operating state.

10. The control device of claim 9, wherein the operations further comprise reducing a torque limit for driver requested torque in response to the electrical resistance increase.

11. The control device of claim 10, wherein the shift element is a hydraulically actuated multi-disc friction shift element and the shift element actuator is a solenoid valve.

12. The control device of claim 11, wherein adjusting the electrical current to the solenoid valve comprises reducing the electrical current to the solenoid valve.

13. The control device of claim 10, wherein the operations further comprise reducing the torque limit and adjusting the electrical current prior to shifting the automatic transmission to the gear in which the shift element is in the open operating state.

14. The control device of claim 9, wherein the shift element is a hydraulically actuated multi-disc friction shift element and the shift element actuator is a solenoid valve.

15. The control device of claim 9, wherein the operations further comprise maintaining the automatic transmission in the gear in which the shift element is in the open operating state until standstill of a vehicle associated with the automatic transmission.

16. The control device of claim 9, wherein the operations further comprise activating a warning in response to the electrical resistance increase, the warning informing a user of the automatic transmission of a fault in the automatic transmission.

17. A method for operating an automatic transmission with resistance change in a control system of the automatic transmission, comprising:
    detecting an electrical resistance increase in a control loop for a solenoid valve of the automatic transmission, the solenoid valve operable to adjust a multidisc friction shift element of the automatic transmission between an open operating state and a closed operating state;
    reducing a torque limit for driver requested torque in response to the electrical resistance increase;
    adjusting an electrical current to the solenoid valve in response to the electrical resistance increase; and
    after reducing the torque limit and adjusting the electrical current, shifting the automatic transmission to a gear in which the multi-disc friction shift element is in the open operating state.

18. The method of claim 17, further comprising activating a warning in response to the electrical resistance increase, the warning informing a user of the automatic transmission of a fault in the automatic transmission.

* * * * *